(12) United States Patent
Karaoglu

(10) Patent No.: US 6,372,342 B1
(45) Date of Patent: Apr. 16, 2002

(54) BACKING FOR DUCT TAPES

(75) Inventor: Azmi Karaoglu, Sarasota, FL (US)

(73) Assignee: Intertape Polymer Group Inc., Montreal (CA)

( * ) Notice: Subject to any disclaimer, the term of this patent is extended or adjusted under 35 U.S.C. 154(b) by 0 days.

(21) Appl. No.: 09/454,368

(22) Filed: Dec. 3, 1999

(51) Int. Cl.[7] .............................. B32B 7/12; B32B 27/04
(52) U.S. Cl. ...................... 428/354; 428/352; 428/343; 428/356; 442/151
(58) Field of Search ........................... 428/352, 343, 428/354, 356; 442/151

(56) References Cited

U.S. PATENT DOCUMENTS 4,188,442 A 2/1980 Asakura et al. ............. 428/216
5,700,571 A 12/1997 Logue et al. ................ 428/352

FOREIGN PATENT DOCUMENTS

EP 0336727 A 10/1989
WO WO 93/06183 4/1993

OTHER PUBLICATIONS

European Search Report issued regarding corresponding European Patent Application No. 00126065.2 issued on Jan. 29, 2001.

Primary Examiner—Blaine Copenheaver
Assistant Examiner—Hai Vo
(74) Attorney, Agent, or Firm—Thompson Hine LLP

(57) ABSTRACT

Novel duct tapes comprising a water-impermeable sheet backing carrying, in order, a cloth material and an adhesive layer, wherein the backing is a coextruded laminate which, in the preferred case, incorporates a release agent in the lamina on the surface opposite the adhesive.

14 Claims, 1 Drawing Sheet

BACKING FOR DUCT TAPES

BACKGROUND OF THE INVENTION

The present invention is directed to adhesive tapes and, more particularly, to duct tapes having a backing which is more cost-effective to manufacture. In its simplest form, duct tapes comprise a cloth material carrying an adhesive layer on one surface thereof Commercially available duct tapes additionally have an outer water-impermeable, flexible plastic laminated to the cloth layer. The cloth layer provides reinforcement and increased tensile strength and the backing is typically about 1–4 mils thick and provides the requisite dimensional stability to the tape. Conventionally, the backing material has been formed from a flexible plastic support, e.g. a cellulose ester such as cellulose acetate, cellulose triacetate, and the like; a polyester such as polyethylene terephthalate; or a polyolefin such as polyethylene or polypropylene. Most typically, the backing has been formed from polyethylenes, e.g. low density, high density, or linear low density polyethylene, including mixtures thereof.

While duct tapes have achieved wide market acceptance, there is a need for a duct tape that can be manufactured more cost effectively whereby the cost for producing a tape of comparable end use properties may be significantly reduced.

In accordance with the present invention, attention has been focused on developing a more cost efficient substitute for polyolefin backings. Conventionally polyolefin backings used in the manufacture of duct tape have been formed using a blown film extrusion process and coated on one side with a release agent which enables the tape to be wound into a roll and readily unwound. In the blown film process a film is blown from the extruder die and this film is compressed as it is passed between a pair of nip rollers. The blown film extrusion process is comparatively expensive to perform and the additional manufacturing step of coating the backing with a release agent further adds to the cost of manufacturing the product.

SUMMARY OF THE INVENTION

In accordance with the present invention, a support for duct tape is provided which is a co-extruded laminate comprising a D layer of low density polyethylene (LDPE), a first B layer of a blend of LDPE and high density polyethylene (HDPE), a C layer of a blend of LDPE and a pigment, a second B layer, and an A layer of LDPE which preferably includes a release agent. LDPE and HDPE polymers are commodity materials available from Exxon Corporation and Dow Chemical Company. The backing is typically about 1 to 4 mils thick. When the A layer contains a release agent, it provides a release surface that enables the tape to be self-wound to form a roll and dispensed by unwinding without undue force. The layers typically constitute the following approximate proportions by weight of the backing:

| Layer | Amount (wt %) | Make-up |
|---|---|---|
| A | 10–25% | LDPE and release |
| B | 15–40% | LDPE and HDPE |
| C | 15–40% | HPPE and pigment |
| B | 15–40% | LDPE and HDPE |
| D | 10–25% | LDPE |

This backing has many of the advantages of backings formed by the blown film extrusion method but can be manufactured using a less expensive cast coextrusion process. Furthermore, in accordance with the preferred embodiment of the invention, a release agent is incorporated into the lamina on the surface opposite the adhesive (i.e., the A layer) thereby obviating the application of the release agent as a separate process.

Adhesive tapes in accordance with the invention comprise a laminar structure comprising, in order, a coextruded backing as herein described in detail, a cloth scrim; and a layer of adhesive, e.g. pressure-sensitive adhesive.

DETAILED DESCRIPTION OF THE INVENTION

Figure 1:
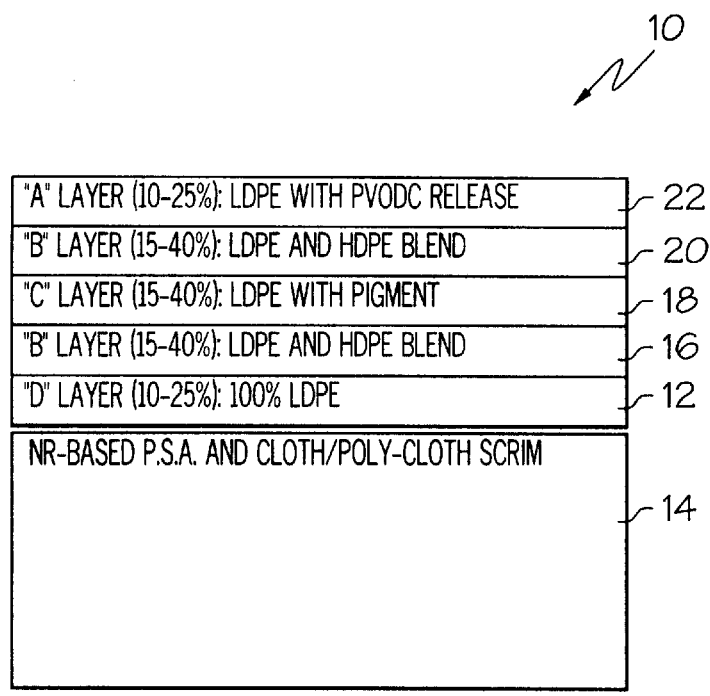
FIG. 1 is cross-sectional view of the backing of the present invention.

In accordance with the invention the backing is a five layer coextruded pigmented polyethylene film structure as shown in FIG. 1. The backing 10 includes a first layer 12 of low density polyethylene (LDPE) which is herein referred to as a D layer upon which the adhesive and scrim 14 are provided. The D layer is adjacent a layer 16 of a blend of LDPE and high density polyethylene (HDPE) which is herein referred to as a C layer. This blend can contain about 1 to 25% HDPE and 75 to 99% LDPE.

At the middle of the film is a pigmented layer 18 known as a C layer. This layer may contain about 1 to 20% pigment and 75 to 99% LDPE. Any of the pigments conventionally used in polyethylene films such as carbon black can be used in the layer 18. Usually a silver or black colored pigment is used. Pigments useful herein are available from Ampacet such as Ampacet's Black PE MB, Grey PE MB and Silver PE MB. The pigmented layer 18 faces another B layer 20 and an surface layer 22 referred to as an A layer containing LDPE and preferably but optionally about 5 to 50% (unless otherwise indicated all percentages herein are expressed in terms of weight) of a release agent. Preferably the A layer is formed by blending the release agent into the LDPE and coextruding the composition. The preferred release agents for use in this embodiment of the invention are polyethyleneimine octadecyl carbamide (PEODC) and/or polyvinyl octadecyl carbamate (PVODC). The blended LDPE/HDPE layers within the film structure prevent the release agent from migrating within the film structure and causing separation and reduction of adhesion on the opposite face of the backing. When layer 22 does not contain a release agent it may be overcoated with a release agent in a manner known in the art. This coextruded film structure must perform at temperatures ranging from 0 to 220° F. That is the layers making up the film must remain firmly bonded together throughout this temperature range.

The pressure sensitive adhesive and the scrim may be coated and applied onto layer D using a calendar method. In some cases it may be desirable to treat the surface of the D layer by either flame, corona or chemical methods to improve adhesion to the adhesive and to broaden the performance characteristics of the tape.

The coextruded film structure is preferably manufactured using a cast extrusion line in which the film is extruded onto a cooled cast roller. The backing is particularly desirable because it can be formed without using a blown film extrusion line but it provides the orientation and other physical characteristics of a blown film. In accordance with the present invention, polymer composition for each of layers as described above is fed into four extrudes in a manner known in the art to form the backing. The five contiguously extruded layers are deposited onto a cooled casting roll to form the backing. The backing film of the invention can be manufactured by feeding polymer compositions for the A-D layers to a Gloucester extruder. The compositions are typically fed to the extrudes at a rate of about 1000 to 5000 lbs/hr under the following operating conditions.

| A layer- | 380–540° F. | max 750 lbs./hr |
| B layer- | 380–540° F. | max 1500 lbs./hr |
| C layer- | 380–540° F. | max 1000 lbs./hr |
| D layer- | 380–540° F. | max 750 lbs./hr |

The layers are extruded through a slot die at up to 550° F. setting into contact with a cast roll cooled to a temperature of about 40 to 90° F. The thickness of the film, as measured from one planar surface to the other planar surface, can run from 1 to 4 mils and may be varied in accordance with the respective speeds of the line (take-up) speed and the feed (extruded) speed.

Figure 2:
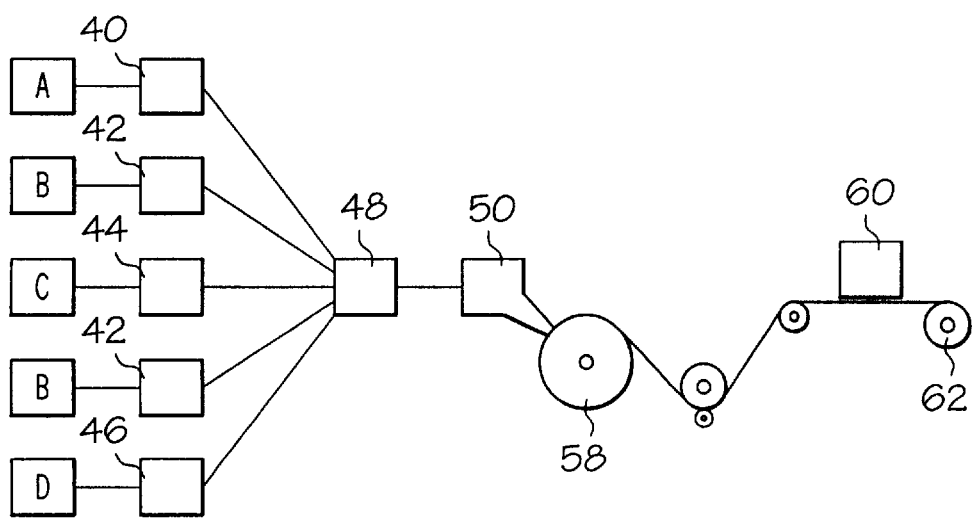
FIG. 2 is a schematic illustration of a cast extrusion process useful in preparing a backing in accordance with the invention.

FIG. 2 schematically illustrates that a process for manufacturing the backing that is used in accordance with the invention. The compositions for each of the backing layers A through D are fed through a blender or hopper (designated by letter) to a series of extruders 40, 42, 44, and 46 corresponding to each of the compositions. The extruders feed a five layer block 48 which in turn feeds a slot die 50. The slot die deposits a 5-layer film onto the surface of the cast film roller 58. The backing can subsequently be treated, for example by corona discharge at station 60 and the completed product wound onto winder 62.

The duct tapes of this invention will preferably comprise a water-impermeable flexible plastic sheet material carrying on the surface thereof, in order: (1) a laminating adhesive layer; (2) a reinforcing cloth material or scrim; and (3) an outer "user" pressure-sensitive adhesive layer.

The scrim employed will preferably be a woven web which is readily tearable in the cross machine direction. The cloth web may be selected from any of the known web materials such as those heretofore employed in the manufacture of tapes. It may be made from natural fibers such as cotton or wool, synthetic fibers about 40 to 150 d such as polyester, or mixtures of such fibers and may, for example, be on the order of 2–8 mils thick. However, greater or lesser thicknesses may be employed and still have a useful product in accordance with this invention. For flexibility as well as the ability to manufacture the tape in roll form, the cloth ordinarily should have a thread count of about 5 to 50 by 5 to 40,e.g., 5×5 to 50×40. With woven cloths of lesser thread count, the adhesive layer may tend to flow through the cloth, making the resulting product commercially unacceptable. It may, for example, be a 20×14 cotton/polyester fabric, a 42×28 woven cotton, etc. Scrims useful in making tape in accordance with this invention are available from Milliken.

Following preparation of the backing sheet in the aforementioned manner, the cloth intermediate layer and the adhesive outer layer of the duct tape may be applied to the backing in a known manner. The D layer of the backing film will be coated with a pressure sensitive adhesive. Alternatively the film can be coated with a thin layer of a laminating adhesive such as a water based acrylic adhesive or an extruded polyethylene and then overlaid with the scrim. This laminating adhesive need not be a pressure-sensitive adhesive. The thin layer of adhesive bonds the scrim to the substrate. The scrim is overcoated with the pressure sensitive adhesive to form the tape.

A tape can also be manufactured utilizing a 3-roll calender. As is known, in utilizing a 3-roll mill of this type, the adhesive will adhere to the cooler of the superposed rolls where it is applied. Thus, for example, such a 3-roll calender is set up so that a web of the backing from a feed roll is passed along the outer surface of the third roll; a web of cloth from a feed roll is passed between the middle and third rolls; a mass of adhesive is provided at the nip of the first and second rolls; and a second mass of adhesive is provided at the nip of the middle and third rolls so as to contact the side of the cloth contiguous to the third roll. In operation, the first-mentioned mass of adhesive adheres to the cooler middle roll and is applied to the surface of the cloth contiguous to the middle roll. As the rolls then turn, the cloth is sandwiched between two adhesive layers which may be of the same composition or different but which, as will be detailed hereinafter are preferably of different thicknesses. As the rolls then continue to turn so that the adhesive-coated cloth is brought into superposition with the non-embossed side of the backing material, the cloth is then adhered to the backing through the adhesive layer on that surface of the cloth. The resulting laminar structure may then be described as comprising the backing carrying, on the surface thereof, in order, a first adhesive layer, the cloth, and a second or "user" adhesive layer. A portion of the adhesive will penetrate the interstices or porous structure of the cloth.

The user adhesive can comprise a layer of a tacky pressure-sensitive adhesive, e.g. a rubber-based adhesive. However, the laminating adhesive optionally used to bond the cloth to the backing can be an acrylic based adhesive or a rubber-based. The laminating adhesive need not be tacky as long as it provides a good cloth to backing bond.

The laminating adhesive and the user adhesive layers are preferably of different thicknesses. The laminating adhesive layer need only be relatively thin, e.g. on the order of 1–2 mils in order to bond the cloth to the backing. However, the user adhesive on the inner surface of the tape should preferably be thicker. The two adhesives, if different, will be selected so as to be compatible in the sense of providing a good adhesive to adhesive bond so that the second adhesive layer will in part penetrate through the cloth to bond to the first adhesive layer, thereby increasing the structural stability of the laminar tape assembly.

The user adhesive may be on the order of 1 to about 4 mils thick, most preferably on the order of about 1.5–2.0 mils thick and, as previously discussed, will preferably be a pressure-sensitive rubber-based adhesive of the type heretofore known and used in commercially available industrial tapes, e.g. industrial tapes. These adhesives will in general comprise one or more rubbery elastomers, one or more tackifying resins, filler and other reagents such as a colorant (according to the desired color for the backing), antioxidant, etc. Since these adhesives are so well known in the art, they need not be described in further detail. While in theory, the adhesive coating could comprise any of the known heat-or water-activated adhesives, the adhesive layer is usually a pressure-sensitive adhesive, e.g. an acrylic or rubber-based pressure-sensitive adhesive. The adhesive layer will preferably comprise a pressure-sensitive rubber-based adhesive. As is known and understood in the art, rubber-based adhesives will comprise at least one rubbery elastomer and at least one tackifying resin along with other additives performing specific desired functions, e.g. a colorant, fillers, antioxidants, etc. The elastomers employed in such adhesives may be defined as being polymeric materials having rubber-like properties. Examples of such materials include natural rubber, cyclized rubber, styrene-butadiene copolymer (SBR), acrylonitrile-butadiene copolymer (NBR), chlorinated rubber polychloroprene (neoprene) rubber hydrochloride, polysulfide rubber, carboxylic elastomers, silicone rubber, polyurethane rubber, acrylonitrile-butadiene-styrene (ABS), reclaimed rubber, butyl rubber, polyisoprene, polyisobutylene, ethylene-propylene-diene monomer terpolymer rubber (EPDM), the "Kraton" (trademark of Shell Chemical) family of rubbery polymers, a terpolymer of acrylic acid, an acrylate and an acetic acid ester, etc.

As is known, the backing sheet may contain other materials performing specific desired functions, e.g., a flame retardant, e.g. a brominated aromatic amide such as ethylene bis-tetrabromophthalamide or a chlorinated cycloaliphatic flame retardant, and the like.

In one embodiment of the invention, the release characteristic is imparted to the outside surface of the A layer using a conventional technique such as applying an aqueous or solvent solution of the release agent to the film. When the tape is unwound, the adhesive must remain on the side to which it was coated. The tape should not split, delaminate or transfer even if aged at elevated temperatures such as 150° F. or 66° C. Release coating of carriers utilized in the manufacture of tape products has evolved into a considerable and largely proprietary technology. A release coating's primary function is to control the adhesion of the adhesive to the carrier utilized in the structure. Release coatings may be applied from both a solvent or water solution depending upon both the release agent necessary and the type of carrier to be coated. The amount of release coating applied depends on the type of carrier, adhesive utilized and the desired release characteristics of the final structure. Current release coating technology utilizes a solution of between 0.1 and a 5% PVODC dissolved in a solvent such as, but not limited to, toluene. During pressure sensitive tape manufacturing, the release coating solution is typically applied to and doctored off the film utilizing various types of doctoring methods, for example scrape blade method, mayer rod or air knife. In a typical in-line production process, the application of the release coating is followed by drying of the coating which is typically accomplished utilizing ovens that are typically based on radiation, convection or conduction technologies.

Utilizing current production coating methods, it is virtually impossible to apply the release coat to the film at a consistent coat weight due to the limitations of the previously described coating methods. This results in a significant variance in finished tape properties especially as they relate to adhesion to backing and unwind values. Typical products release coated in this manner exhibit significant variation in both roll to roll release characteristic (cross-web direction variation). Historically, customers cited this variance as a barrier to purchase. Additionally, utilizing the current method of release coating makes it difficult to adjust the level for a desired unwind value, which is crucial for the pressure sensitive tape market. In accordance with the preferred embodiment of the invention, the release agent is incorporated into the extruded A layer. This can eliminate the need for the entire in-line, solvent-cast, release coating process as well as the associated capital equipment necessary for in-line compounding, application and drying of a solution-based release. This equipment can include but is not limited to coating stations, solvent recovery equipment, drying ovens, compounding equipment, solvent and coating storage containers, and associated supply pumps and hoses. The net result will be improved production efficiencies through elimination of release coating and associated capital equipment as well as controllable and consistent performance characteristics of the product, specifically those properties generally associated with the release layer such as unwind force.

Since certain changes may be made without departing from the scope of the invention as herein described, it is intended that all matter contained the foregoing description, including the examples, shall be taken as illustrative and not in a limiting sense.

What is claimed is:

1. An adhesive tape comprising a backing material carrying on one surface thereof, in order, a reinforcing cloth material tearable in the cross direction and an adhesive layer, wherein the backing is a coextruded laminate of the following layers in the order recited: a first layer of low density polyethylene (LDPE), a layer of a blend of LDPE and high density polyethylene(HDPE), a pigmented layer of LDPE, a layer of a blend of LDPE and HDPE and a second layer of LDPE.

2. The adhesive tape of claim 1 wherein said adhesive layer comprises a rubber-based pressure sensitive adhesive.

3. The adhesive tape of claim 2 wherein said cloth material comprises a woven cloth containing fibers selected from the group consisting of natural fibers, synthetic fibers and mixtures of natural and synthetic fibers.

4. The adhesive tape of claim 3 wherein said blend of LDPE and HDPE contains about 1 to 25% HDPE and about 75 to 99% LDPE.

5. The adhesive tape of claim 4 wherein said pigmented layer contains about 1 to 20% of a polyethylene based pigment and about 80 to 99% of LDPE.

6. The adhesive tape of claim 5 wherein the layer of LDPE on the surface of said backing opposite said cloth contains a release agent.

7. The adhesive tape of claim 6 wherein said layer of LDPE contains about 5 to 50% by weight of said release agent.

8. The adhesive tape of claim 7 wherein said release agent is polyethyleneimine octadecyl carbamide (PEODC) and/or polyvinyl octadecyl carbamate (PVODC).

9. The adhesive tape of claim 8 wherein said backing is made up of about 10 to 25% of said first layer of low density polyethylene (LDPE), about 10 to 40% of said layer of a blend of LDPE and high density polyethylene(HDPE), about 15 to 40% of said pigmented layer of LDPE, about 15 to 40% of said second layer of a blend of LDPE and HDPE and about 10 to 25% of said second layer of LDPE.

10. The adhesive tape of claim 9 wherein said backing is manufactured by cast coextrusion.

11. The adhesive tape of claim 10 wherein said backing sheet material is about 1 to about 4 mils thick.

12. The adhesive tape of claim 11 wherein said tape does not split, delaminate or transfer at temperatures up to about 150 F.

13. The adhesive tape of claim 12 wherein the adhesive is a natural rubber based 100% solids adhesive.

14. The adhesive tape of claim 1 wherein at least a portion of said first mentioned adhesive layer permeates the interstices of said cloth and is adhered to a layer of a laminating adhesive which is interposed between said cloth and said backing.

* * * * *